(12) United States Patent
Choo et al.

(10) Patent No.: US 7,161,055 B2
(45) Date of Patent: Jan. 9, 2007

(54) METHOD OF EXTRACTING AND ISOLATING MINOR COMPONENTS FROM VEGETABLE OIL

(75) Inventors: Yuen May Choo, Selangor (MY); Mei Han Ng, Selangor (MY); Ah Ngan Ma, Selangor (MY); Yusof Basiron, Selangor (MY)

(73) Assignee: Malaysian Palm Oil Board (MY)

( * ) Notice: Subject to any disclaimer, the term of this patent is extended or adjusted under 35 U.S.C. 154(b) by 521 days.

(21) Appl. No.: 10/721,001

(22) Filed: Nov. 25, 2003

(65) Prior Publication Data

US 2004/0158083 A1 Aug. 12, 2004

(30) Foreign Application Priority Data

Nov. 27, 2002 (MY) ............... PI 20024432

(51) Int. Cl.
*C07C 7/00* (2006.01)
*C07D 311/72* (2006.01)
*C07J 9/00* (2006.01)

(52) U.S. Cl. ............ 585/864; 549/410; 552/540

(58) Field of Classification Search .......... 549/410; 552/540; 585/864
See application file for complete search history.

(56) References Cited

U.S. PATENT DOCUMENTS

| | | | |
|---|---|---|---|
| 2,432,021 A | 12/1947 | Larner | 167/81 |
| 2,460,976 A | 2/1949 | Church | 260/8 |
| 2,484,040 A | 10/1949 | Lange et al. | 260/555 |
| 2,572,467 A | 10/1951 | Gebhart | 260/236.5 |
| 2,652,433 A | 9/1953 | Blaizot | 260/666 |
| 5,157,132 A | 10/1992 | Tan et al. | 549/413 |
| 6,072,092 A | 6/2000 | Ooi et al. | 585/351 |

FOREIGN PATENT DOCUMENTS

| | | |
|---|---|---|
| GB | 567 682 | 2/1945 |
| GB | 691 924 | 5/1953 |
| GB | 1 563 794 | 4/1980 |
| GB | 2 160 874 | 1/1986 |
| GB | 2 218 989 | 11/1989 |

*Primary Examiner*—Taofiq Solola
(74) *Attorney, Agent, or Firm*—Morgan Lewis & Bockius LLP

(57) ABSTRACT

A process for the separation and recovery of minor components from vegetable oil such as palm oil. Esterified palm oil is subjected to molecular distillation giving a concentrate rich in minor components. The concentrate is then adsorbed to adsorbents such as normal phase silica gel, reversed phase (particularly C18) silica gel or neutral alumina as well as polymer absorbents such as polyethylene glycol and polyacrylate polyalcohol. Minor components such as squalene, carotenes, tocols and sterols are then selectively desorbed, separated and recovered using solvents operating at isocratic conditions. The desorption of the said minor components are sped up by applying pressure of between 0.2 to 50 bar. By the same method, individual tocols isomers from palm oil can also be separated and recovered.

19 Claims, No Drawings

METHOD OF EXTRACTING AND ISOLATING MINOR COMPONENTS FROM VEGETABLE OIL

FIELD OF THE INVENTION

The present invention relates to a method of extracting and isolating minor components such as carotenes, tocols in the form of tocopherols and tocotrienols and hydrocarbons such as squalene and phytosterols from vegetable oils, preferably but not necessarily from palm oil.

BACKGROUND OF THE INVENTION

Crude palm oil (CPO) contains about 1% minor components which include carotenes, tocols in the form of tocopherols and tocotrienols and hydrocarbons such as squalene and phytosterols. These minor components are also present in oil that is obtained from the palm pressed fiber in a much higher concentration.

Carotenes, tocols and squalene have been known for long to exhibit antioxidant properties and they are widely used in pharmaceuticals as supplements, nutraceuticals as well as fine chemicals. Squalene, which is widely found in shark liver oil is also present in palm oil and it is a valuable constituent in cosmetics as well as food supplements. Sterols can be used as steroid derivatives in pharmaceuticals. The major sterol present in palm oil, β-sitosterol has been shown to possess hypocholesterolemic effect.

Several methods have been developed to extract these valuable minor components from vegetable oils namely, extraction by saponification which have been disclosed in U.S. Pat. Nos. 2,460,796, 2,572,467 and 2,652,433 as well as in UK Patent No. GB 567,682, iodine method, urea process and extraction by Fuller's earth or activated carbon which have been disclosed in UK Patent Nos. 691,924 and 1,563,794 as well as in U.S. Pat. No. 2,484,040.

Further extraction methods which are known to artisans in the field of the invention are solvent extraction which has been disclosed in U.S. Pat. No. 2,432,021, molecular distillation, solvent partitioning and adsorption which has disclosed in U.S. Pat. No. 5,157,132 and UK Patent No. 2,160,874.

SUMMARY OF THE INVENTION

The present invention relates a method of extracting and isolating minor components such as carotenes, tocols in the form of tocopherols and tocotrienols and hydrocarbons such as squalene and phytosterols from vegetable oils, preferably but not necessarily from palm oil. The said method process comprises the steps of a) esterification of the oil with an alcohol, said esterification provides a mixture of a glycerol, fatty acids esters and the minor components, b) collection of the esters phase containing the minor components from glycerol, c) distillation of the esters phase, said distillation provides a concentrate of squalene, carotenes, tocols and sterols at a temperature from room temperature to 200° C. and under a pressure from 0 to 150 mm Torr, d) dilution of the concentrate in a non-polar solvent or a mixture of non-polar solvent and a polar solvent with a ratio ranges from 90:10 to 99.5:0.5 with a pressure from 0.2 to 50 bar, e) adsorption of the concentrate obtained from step (c) on an adsorbent, f) extraction of the minor components from the concentrate obtained from step (e) by desorption of the minor components using a predetermined mixture of solvents which is a non-polar solvent or a mixture of non-polar solvent and a polar solvent with a ratio ranges from 90:10 to 99.5:0.5 with a pressure from 0.2 to 50 bar and g) desorption of the minor components by a predetermined mixture of solvents.

There is also provided a method for isolating individual carotene such as β-carotene, α-carotene, lycopene, phytoene and phytofluene, individual tocol such as α-, γ- and δ-tocopherol and tocotrienol and individual sterol such as β-sitosterol from vegetable oil under isocratic and isobaric conditions under a pressure between 0.2–1000 bar, the method comprising the steps of a) adsorbing the oil to an adsorbent and b) desorbing the mixture obtained in step (a) a mixture of polar and non-polar solvents.

Also provided a method for isolating individual carotene such as β-carotene, α-carotene, lycopene, phytoene and phytofluene, individual tocol such as α, γ- and δ-tocopherol and tocotrienol and individual sterol such as β-sitosterol from minor components such as squalene, carotenes, tocols and sterols obtained from a method which is conducted under an isocratic condition, the method comprising the steps of a) esterification/transesterification of the oil with an alcohol, said esterification provides a mixture of a glycerol, fatty acids esters and the minor components, b) collection of the esters phase containing the minor components from glycerol, c) distillation of the esters phase, said distillation provides a concentrate of squalene, carotenes, tocols and sterols at a temperature from room temperature to 200° C. and under a pressure from 0 to 150 mm Torr, d) dissolution of the concentrate in a non-polar solvent or a mixture of non-polar solvent and a polar solvent with a ratio ranges from 90:10 to 99.5:0.5 with a pressure from 0.2 to 50 bar, e) adsorption of the concentrate obtained from step (c) on an adsorbent, f) extraction of the minor components from the concentrate obtained from step (e) using a predetermined mixture of solvents which is a non-polar solvent or a mixture of non-polar solvent and a polar solvent with a ratio ranges from 90:10 to 99.5:0.5 with a pressure from 0.2 to 50 bar and g) desorption of the minor components by a predetermined mixture of solvents characterised in that the minor components obtained from the above method undergo a further extraction under isocratic and isobaric conditions under a pressure between 0.2–1000 bar, the extraction comprising the steps of 1) adsorbing the minor components to an adsorbent and 2) desorbing the mixture obtained in step (a) a mixture of polar and non-polar solvents.

The present invention consists of certain novel features and a combination of parts hereinafter fully described and particularly pointed out in the appended claims, it being understood that various changes in the details may be without departing from the scope of the invention, or sacrificing any of the advantage of the present invention.

DETAILED DESCRIPTION OF THE PREFERRED EMBODIMENTS

The present invention relates to a method of extracting and isolating minor components such as carotenes, tocols in the form of tocopherols and tocotrienols and hydrocarbons such as squalene and phytosterols from vegetable oils, preferably but not necessarily from palm oil. Hereinafter, this specification will describe the present invention according to the preferred embodiments. However, it is to be understood that limiting the description to the preferred embodiments of the invention is merely to facilitate discussion of the present invention and it is envisioned that those skilled in the art may devise various modifications and equivalents without departing from the scope of the appended claims.

The vegetable oil is esterified with lower alcohols such as methanol, ethanol, isopropanol and buthanol to give a mixture of glycerol, fatty acids alkyl esters, carotenes, tocols, squalene and sterols. The minor components are contained in the oil phase of the mixture which is then separated from glycerol.

The esters phase containing minor components is subjected to distillation under or without vacuum in which it is heated to not more than 200° C. and distilled at a pressure less than 150 mm Torr to retain as much of the minor components in the concentrate. Upon distillation, the fatty acid alkyl esters are removed from the mixture, leaving a concentrate rich in carotenes, tocols, squalene and sterols.

The concentrate collected is dissolved in a non-polar solvent or a mixture of non-polar solvent and a polar solvent with the non-polar solvent being the major constituent and adsorbed on a selected adsorbent. Different types of adsorbents such as normal-phase silica gel, reversed-phase (particularly C18) silica gel or neutral alumina may be employed. The minor components are extracted and desorbed from the adsorbents by a certain mixture of solvents depending on the type of adsorbent in use. Solvents that are used to desorb as well as to carry the minor components may consist of polar solvents such as ethanol, isopropanol, methanol or buthanol, non-polar solvents such as hexane, heptane, ethyl acetate, isooctane or cyclohexane.

The extraction or fractionation is carried out in an isocratic manner which is an improvement over U.S. Pat. No. 6,072,092 and UK Patent No. GB 2218989 whereby solvents with different polarity are added one after another to desorb all the compounds which is rather time and labour consuming, most important of all it is not technically and economically viable for commercial production. Also, U.S. Pat. No. 6,072,092 has only disclosed recovery of carotenes from palm oil in all the examples whereas the present invention disclose recovery of carotene, vitamin E, sterols and squalene in a single adsorption/desorption process.

The desorption of the minor components from the adsorbents is carried out through a column whereby it is subjected to an applied pressure between 0.2 to 50 bar resulting in faster and more efficient separation.

The above-described process can also be adopted for the isolation of individual carotene (i.e. β-carotene, α-carotene, lycopene, phytoene, phytofluene), tocol (α-, γ- and δ-tocopherol and tocotrienol) and sterol (β-sitosterol) from vegetable oils. Isolation of such individual compounds is an extension of the first extraction or from any sources that are rich in carotenes, tocols or sterols wherein operating pressure of the said process may be in the range of 0.2–1000 bar. Isobaric and isocratic conditions are applied.

Each resulting fractions are then subjected to a second extraction wherein individual carotene (α-carotene, β-carotene, lycopene, phytoene, phytofluene), tocol (α-, γ- and δ-tocopherol and tocotrienol) and β-sitosterol can be isolated and recovered. The second method consists of adsorbing the feed to an adsorbent such as normal-phase silica gel, reversed-phase silica gel or neutral alumina, preferably reversed-phase C18 silica gel and desorbed using a mixture of polar and non-polar solvent. The source of the individual carotenes, tocols and sterols is obtained from vegetable oil or concentrate or phytonutrients rich-fractions. The preferred vegetable oil will be palm oil.

The said process is an isocratic and isobaric process wherein the operating pressure may range from 0.2–1000 bar. Solvents used for desorption may consist of non-polar solvents such as hexane, heptane, ethyl acetate, isooctane or cyclohexane and polar solvents such as ethanol, isopropanol, methanol or buthanol.

It should be appreciated that the isolation of individual carotene, tocol and sterol by the said process can be carried out using the resulting fractions extracted from the concentrate or products from any sources that contains the said compounds.

Following is a description by way of examples of the recovery of carotenes, tocols, hydrocarbons such as squalene and sterols by different adsorbents.

EXAMPLE 1

Crude palm oil methyl esters and palm oil minor components, derived from alcoholic esterification of crude palm oil with 1 to 2% base catalyst and methanol is subjected to molecular distillation at a temperature less than 200° C. and pressure not more than 150 mm Torr to give concentrate with composition of 5% carotene, 0.5% tocols, 0.7% squalene and 0.7% sterols.

1.4 gram sample of the above concentrate is dissolved in 10 milliliters of hexane and added to the top of a normal-phase silica gel packed column of 12 cm long and 4 cm internal diameter. The feed to adsorbent ratio is 23 g/kg. Mixture of hexane and isopropanol with hexane:IPA (99.5: 0.5) is added to the column in which it is applied with not more than 1 bar pressure. Fractions are collected whereby squalene is the first to be eluted. This is followed by carotenes, tocols and last of all the phytosterols. Solvents in the collected fractions are rotavaporised. The concentration of squalene in the squalene fraction is determined by gas chromatography (GC) to be 7%, carotenes in the carotene fraction is determined by UV spectrometry at about 24%. The tocols are determined by HPLC on silica 60A column having the dimension 250 mm ×46 mm I.D. with fluorescent detector. The mobile phase is hexane:THF:IPA (1000:60:4). The concentration of tocols in tocols fraction is about 62%. GC determines the composition of phytosterols and there are about 29% of sterols in sterols fraction.

|  | Squalene | Carotene | Tocols | Sterols |
| --- | --- | --- | --- | --- |
| Concentration in feed, % | 0.7 | 5 | 0.5 | 0.7 |
| Concentration in fraction, % | 7 | 24 | 62 | 29 |
| Recovery % | 92 | 41 | 3 | 5 |

EXAMPLE 2

1.4 gram concentrate obtained from the same manner with the same composition as Example 1 is dissolved in 10 milliliters hexane and added to the top of a 12 cm long, 4 cm internal diameter of normal-phased silica gel packed column. Mixture of Hexane:IPA (99.5:0.5) is then added to the column with an applied pressure of less than 1 bar. Fractions are collected and the concentration of the minor components in their respective fractions is determined to be: carotenes 28% with 87% recovery, tocols 71% with 38% recovery, and sterols 6%.

|  | Carotene | Tocols | Sterols |
|---|---|---|---|
| Concentration in feed, % | 5 | 0.5 | 0.7 |
| Concentration in fraction, % | 28 | 71 | 6 |
| Recovery, % | 87 | 38 | 5 |

EXAMPLE 3

2.5 gram of concentrate obtained from the same manner as in Example 1 is dissolved in hexane and added to the top of a 12 cm long 4 cm internal diameter normal-phase silica packed column. Mixture of hexane:ethanol (99.5:0.5) is added with pressure less than 1 bar to elute the minor components. Fractions collected are determined for carotenes and tocols content. 43% carotenes are recovered from a fraction with 45% carotenes. In the tocols fractions, the concentration of the tocols is determined to be 100% with 8% recovery from that particular fraction.

|  | Carotene | Tocols |
|---|---|---|
| Concentration in feed, % | 5 | 0.5 |
| Concentration in fraction, % | 45 | 100 |
| Recovery, % | 43 | 8 |

EXAMPLE 4

0.5 gram concentrate obtained from the same manner as in Example 1 is added to the top of a 7.5 cm long, 4 cm internal diameter reversed-phase C18 silica gel packed column. Ethanol:hexane (60:40) are added to the top of the column with pressure less than 1 bar to elute the minor components. However, the range of ethanol:hexane can be changed depending on any other conditions up to 90:10. Sterols and tocols are first to be eluted and their concentrations are 4% and 3% each. The recovery of sterols is 72% and tocols is 75%. Carotenes and squalene are eluted in later fractions and the concentration of carotenes in their enriched fraction is 27% and the concentration of squalene is 4% with 40% recovery.

|  | Squalene | Carotene | Tocols | Sterols |
|---|---|---|---|---|
| Concentration in feed, % | 0.7 | 5 | 0.5 | 0.7 |
| Concentration in fraction, % | 4 | 27 | 3 | 4 |
| Recovery, % | 40 | 40 | 75 | 72 |

EXAMPLE 5

1.3 g concentrate obtained from the same manner as Example 1 is dissolved in hexane and added to the top of a 12 cm long. 4 cm internal diameter silica column. Mixture of hexane:ethanol (99.5:0.5) is added to the top of the column with pressure less than 1 bar to desorb the minor components. Fractions collected are determined with the following results:

|  | Squalene | Carotene | Tocols | Sterols |
|---|---|---|---|---|
| Concentration in feed, % | 0.7 | 5 | 0.5 | 0.7 |
| Concentration in fraction, % | 24 | 1 | 3 | 29 |
| Recovery, % | 34 | 3 | 2 | 58 |

EXAMPLE 6

1.5 g concentrate obtained from the same manner as Example 1 is dissolved in hexane and added to the top of a 12 cm long, 4 cm internal diameter silica packed column. Mixture of hexane:IPA (99.5:0.5) is added to the top of the column with pressure less than 0.5 bar to desorb the minor components. Fractions collected are determined with the following results:

|  | Squalene | Carotene |
|---|---|---|
| Concentration in feed, % | 0.1 | 7.9 |
| Concentration in fraction, % | 23 | 64 |
| Recovery, % | 71 | 60 |

The whole process uses less than 1.9 liters solvent and is completed in less than 30 minutes.

EXAMPLE 7

1.6 g concentrate obtained from the same manner as Example 1 is dissolved in hexane and added to the top of a 12 cm long, 4 cm internal diameter C18 column. Mixture of Ethanol:Hexane (60:40) is added to the top to desorb the minor components with pressure less than 1 bar. Composition of carotene recovered is 14% with 12% recovery.

EXAMPLE 8

2.9 g concentrate rich in vitamin E is added to the top of a 12 cm long, 40 mm internal diameter silica column. Hexane:ethyl acetate (80:20) is added to elute the individual vitamin E with pressure less than 0.5 bar. α-tocopherol (α-T) is the first to be eluted followed by α-Tocotrienol (α-$T_3$), γ-Tocopherol (γ-T), γ-Tocotrienol (γ-$T_3$) and last of all, the δ-Tocotrienol (δ-$T_3$). The purity of respective collected tocols are as follows:

|  | α-T | α-$T_3$ | γ-T | γ-$T_3$ | δ-$T_3$ |
|---|---|---|---|---|---|
| Composition in feed, % | 9 | 9 | 1 | 16 | 3 |
| Composition in fraction, % | 42 | 54 | 9 | 68 | 40 |
| Recovery, % | 24 | 28 | 41 | 21 | 64 |

EXAMPLE 9

2.5 g concentrate rich in vitamin E is loaded to a 12 cm long, 40 mm internal diameter silica column. Hexane:Ethyl Acetate (86:14) is added to elute the vitamin E with pressure less than 0.5 bar. The purity of the respective tocols collected are as follows:

|   | α-T | α-T$_3$ | γ-T | γ-T$_3$ | δ-T$_3$ |
|---|---|---|---|---|---|
| Composition in feed, % | 9 | 9 | 1 | 16 | 3 |
| Composition in fraction, % | 46 | 28 | 8 | 80 | 56 |
| Recovery, % | 33 | 22 | 32 | 30 | 49 |

EXAMPLE 10

0.8 g concentrate obtained from the same manner as Example 1 is dissolved in hexane and loaded to a 25 cm long, 20 cm internal diameter silica column. Mixture of hexane:IPA (98:2) is added to the column with pressure less than 1500 psi to desorb the minor components. Squalene is the first to be collected followed by carotenes, vitamin E, sterols and last of all the unreacted diglycerides. The composition of the fractions are collected are as follows:

|   | Squalene | Carotene | Vitamin E | Sterols | Diglycerides |
|---|---|---|---|---|---|
| Composition in feed, % | 1.5 | 2.6 | 1.9 | 0.9 | 2.6 |
| Composition in fraction, % | 4 | 50 | 18 | 3.4 | 20 |
| Recovery, % | 34 | 47 | 9 | 1 | 13 |

EXAMPLE 11

1.6 g concentrate obtained from the same manner as Example 1 is loaded into a 7 cm long, 13 cm internal diameter silica packed column. 100% hexane is added to the top to desorb the minor components with pressure less than 1 bar. First fraction collected consists of squalene while the second fraction consists of carotene. After the carotene fraction is collected, the polarity of the mobile phase is gradually increase using isopropanol started with 2–5% IPA in hexane. The later fraction collected consists of Vitamin E followed by sterols. The compositions and recovery of these fractions are as follows:

|   | Squalene | Carotene | Vitamin E | Sterols |
|---|---|---|---|---|
| Composition in feed, % | 1.5 | 6.8 | 2.6 | 0.4 |
| Composition in fraction, % | 31 | 50 | 1.4 | 1.1 |
| Recovery, % | 80 | 39 | 26 | 25 |

EXAMPLE 12

A 40 mm I.D. column is packed with 6.6 cm length normal phase silica and top up with 0.9 cm acid treated Florisil. The silica and acid treated Florisil are separated from each other with a layer of filter paper. 1.3 gram concentrate obtained from the same manner as Example 1 are added to the top of this column. Feed to adsorbent ratio is 43 g/kg. The concentrate consisted of 0.3% squalene. 3% carotene, 1% vitamin E, 0.6% sterols and 4% monoglycerides. Hexane:IPA (99.5:0.5) are added to the top of the column to desorb the minor components with pressure less than 1 bar. Four fractions are collected.

The whole run took less than 20 minutes. The first fraction is colorless consisted of 34% squalene with 80% recovery. The second fraction is red in color consisted of 83% carotene with 53% recovery while the third fraction being orangey in color consisted of 3% vitamin E with 87% recovery. The last fraction is colorless consisted of 2% sterols. After the last fraction is collected, residues in acid treated florisil are extracted using IPA. This residue consisted 30% monoglycerides.

EXAMPLE 13

A 40 mm I.D. column is packed with 6.8 cm length normal phase silica and top up with 0.7 cm polyethylene glycol. The silica and polyethylene glycol are separated from each other with a layer of filter paper. 1.3 gram concentrate obtained from the same manner as Example 1 are added to the top of this column. The concentrate consisted of 0.4% squalene. 3% carotene, 4% vitamin E, 0.1% sterols and 5% monoglycerides. Hexane:IPA (99.5:0.5) are added to the top of the column to desorb the minor components with pressure less than 1 bar. Five fractions are collected. The first fraction is colorless consisted of 30% squalene with 53% recovery. The second fraction is red in color consisted of 40% carotene with 80% recovery while the third fraction being orangey in color consisted of 10% vitamin E with 85% recovery. The fourth fraction is colorless consisted of 1% sterols with 35% recovery. The last fraction consisted of 75% diglycerides with 80% recovery. After the last fraction is collected, residues in polymer are extracted using IPA. This residue consists of 6% monoglycerides.

EXAMPLE 14

A 40 mm I.D. column is packed with 6.9 cm length normal phase silica and top up with 0.6 cm polyacrylate polyalcohol. The silica and polymer separated from each other with a layer of filter paper. 1.3 gram concentrate obtained from the same manner as Example 1 are added to the top of this column. The concentrate consisted of 0.4% squalene. 3% carotene, 4% vitamin E, 0.1% sterols and 5% monoglycerides. Hexane:IPA (99.5:0.5) are added to the top of the column to desorb the minor components with pressure less than 1 bar. Five fractions are collected. The first fraction is colorless consisted of 30% squalene with 70% recovery. The second fraction is red in color consisted of 34% carotene with 60% recovery while the third fraction being orangey in color consisted of 10% vitamin E with 60% recovery. The fourth fraction is colorless consisted of 0.7% sterols with 100% recovery and the last fraction consisted of 60% diglycerides with 90% recovery. After the last fraction is collected, residues in polymer are extracted using IPA. This residue consisted 30% monoglycerides.

EXAMPLE 15

1.3 g concentrate obtained from the same manner as Example 1 is dissolved in hexane and added to the top of a 7.5 cm long. 4 cm internal diameter silica column. Mixture of Hexane:IPA (99.5:0.5) is added to the top of the column with pressure less than 2 bar with flowrate 18 ml/min to desorb the minor components. Fractions collected are determined with the following results:

|  | Squalene | Carotene | Tocols | Sterols |
|---|---|---|---|---|
| Concentration in feed, % | 0.2 | 2.6 | 1.0 | 0.8 |
| Concentration in fraction, % | 10 | 95 | 3 | 2.0 |
| Recovery, % | 93 | 96 | 84 | 21 |

EXAMPLE 16

1.5 g concentrate obtained from the same manner as Example 1 is dissolved in hexane and added to the top of a 12 cm long. 4 cm internal diameter silica column. Mixture of Hexane:IPA (99.5:0.5) is added to the top of the column with pressure at least 0.5 bar to desorb the minor components. Fractions collected are determined with the following results:

|  | Squalene | Carotene | Tocols | Sterols |
|---|---|---|---|---|
| Concentration in feed, % | 0.2 | 4.2 | 1.0 | 0.8 |
| Concentration in fraction, % | 10 | 67 | 14.0 | 1.4 |
| Recovery, % | 100 | 42 | 60 | 41 |

EXAMPLE 17

0.5 g concentrate obtained from the same manner as Example 1 is dissolved in dichloromethane and loaded to a 25 cm length, 20 cm internal diameter RP C18 column. Mixture of acetonitrile:DCM (89:11) is added to the column with pressure less than 1500 psi to desorb the carotenes. Four fractions are collected based on their respective UV-Vis absorption maxima. The first fraction with UV-Vis abs max at 500 nm is 98% lycopene with 80% recovery. Second fraction consisted of α-carotene while the third fraction consisted of β-carotene. The last fraction collected with UV-Vis abs max at 286 nm is 95% phytoene with 80% recovery.

EXAMPLE 18

0.2 g sterols-rich fraction obtained from the first extraction is dissolved in methanol and loaded to a 25 cm length, 20 mm internal diameter RP C18 column. Mixture of MeOH:H20:CH3COOH (98:1:1) is added to the column with pressure less than 1500 psi to desorb the sterols. 5 fractions were collected in which the last fraction consisted of b-sitosterol with more than 98% purity. Recovery of the said compound is >60%.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

The invention claimed is:

1. A method for separating squalenes, carotenes, tocols, and sterols from a vegetable oil under isocratic conditions, comprising the steps of:
   a) esterifying the vegetable oil with an alcohol to provide a first mixture comprising glycerol, fatty acid esters, and the squalenes, carotenes, tocols, and sterols;
   b) separating the glycerol from the fatty acids and the squalenes, carotenes, tocols, and sterols to provide a second mixture comprising the fatty acids and the squalenes, carotenes, tocols, and sterols;
   c) distilling the second mixture at a temperature ranging from room temperature to 200° C. and a pressure ranging from 0 to 150 mm Torr to provide a concentrate comprising squalenes, carotenes, tocols, and sterols;
   d) diluting of the concentrate in a non-polar solvent or a mixture of non-polar solvent and a polar solvent with a ratio of non-polar solvent to polar solvent ranges from 90:10 to 99.5:0.5;
   e) adsorbing the squalenes, carotenes, tocols, and sterols in the diluted concentrate obtained from step (d) on an adsorbent;
   f) desorbing the minor components from the absorbent at a pressure from 0.2 to 50 bar using a non-polar solvent or a mixture of non-polar solvent and a polar solvent wherein the ratio of the non-polar solvent to the polar solvent ranges from 90:10 to 99:0.5 to provide the squalenes, carotenes, tocols, and sterols.

2. The method of claim 1, wherein the vegetable oil is palm oil.

3. The method of claim 1, wherein the alcohol in step (a) is selected from the group consisting of methanol, ethanol, iso-propanol and buthanol.

4. The method of claim 1, wherein the adsorbents used in step (e) is selected the group consisting of normal-phase silica gel, reversed-phase silica gel, neutral alumina, and polymer adsorbents.

5. The method of claim 1, wherein the non-polar solvent selected from the group consisting of hexane, heptane, dichloromethane, cyclohexane, petroleum ether, ethyl acetate, isooctane, and cyclohexane.

6. The method of claim 1, wherein the polar solvent selected from the group consisting of ethanol, isopropanol, methanol, buthanol or acetonitrile.

7. A method for separating individual carotenes, individual tocols, or individual sterols from vegetable oil comprising the steps of
   a) adsorbing the oil to an adsorbent; and
   b) desorbing the individual carotenes, tocols, and sterols from the absorbent using a mixture of polar and non-polar solvents; wherein steps (a) and (b) are performed under isocratic and isobaric conditions at a pressure ranging from 0.2–1000 bar.

8. The method of claim 7, further comprising concentrating the vegetable oil or obtaining a phytonutrients rich-fraction from vegetable oil.

9. The method of claim 7, wherein the vegetable oil is palm oil.

10. The method of claim 7, wherein the adsorbent is selected from the group consisting of normal phase silica gel, reversed-phase silica gel, neutral alumina, and polymer adsorbents.

11. The method of claim 7, wherein the non-polar solvent is selected from the group consisting of hexane, heptane, ethyl acetate, isooctane or cyclohexane.

12. The method of claim 7, wherein the polar solvent is selected from the group consisting of ethanol, iso-propanol, methanol or buthanol.

13. A method for isolating individual carotenes, individual tocols, and individual sterols from a mixture from a mixture comprising squalenes, carotenes, tocols, and sterols comprising the steps of:
   a) esterifying the mixture with an alcohol to provide a second mixture comprising glycerol, fatty acids esters, and the individual carotenes, individual tocols, and individual sterols;
   b) separating the glycerol from the second mixture to provide a third mixture comprising the fatty acid esters and the individual carotenes, individual tocols, and individual sterols;
   c) distilling the third mixture at a temperature ranging from room temperature to 200° C. and a pressure ranging from 0 to 150 mm Torr to provide a concentrate comprising squalenes, carotenes, tocols, and sterols;
   d) diluting the concentrate in a non-polar solvent or a mixture of non-polar solvent and a polar solvent wherein the ratio of the non-polar solvent to the polar solvent ranges from 90:10 to 99.5:0.5;
   e) adsorbing the individual carotenes, individual tocols, and individual sterol of the concentrate obtained from (d) on an absorbent;
   f) desorbing the individual carotenes, individual tocols, and individual sterols from the absorbent at a pressure from 0.2 to 50 bar using a non-polar solvent or a mixture of a non-polar solvent and a polar solvent wherein the ratio of the non-polar solvent to the polar solvent ranges from 90:10 to 99.5:0.5 to provide a fraction containing the individual carotenes, a fraction containing the individual tocols, and a fraction containing the individual sterols;
   g) obtaining individual carotenes, individual tocols, or individual sterols by absorbing the fraction containing the individual carotenes, the fraction containing the individual tocols, or the fraction containing the individual sterols on a second absorbent and desorbing the individual carotenes, individual tocols, or individual sterols from the second absorbent using a mixture of polar and non-polar solvents, wherein the absorbing and desorbing are performed under isocratic and isobaric conditions at a pressure from 0.2–1000bar.

14. The method of claim 13, wherein the carotenes are selected from the group consisting of β-caroteme, α-carotene, lycopene, phytoene, and phytofluene; the individual tocols are selected from the group consisting of α-tocopherol, γ-tocopherol, and δ-tocopherol, and the individual sterol is β-sitosterol.

15. The method of claim 13, wherein the mixture comprising squalenes, carotenes, tocols, and sterols is a vegetable oil.

16. The method of claim 13, wherein the vegetable oil is palm oil.

17. The method of claim 13, wherein the second adsorbent is selected from the group consisting of normal-phase silica gel, reversed-phase silica gel, neutral alumina, and polymer adsorbents.

18. The method of claim 13, wherein the non-polar solvent for step (2) is selected from hexane, heptane, ethyl acetate, isooctane or petroleum ether.

19. The method of claim 13, wherein the polar solvent for step (g) is selected from the group consisting of ethanol, isopropanol, methanol, buthanol, ethyl acetate, and acetonitrile.

* * * * *

UNITED STATES PATENT AND TRADEMARK OFFICE
CERTIFICATE OF CORRECTION

| | | |
|---|---|---|
| PATENT NO. | : 7,161,055 B2 | Page 1 of 1 |
| APPLICATION NO. | : 10/721001 | |
| DATED | : January 9, 2007 | |
| INVENTOR(S) | : Yuen May Choo et al. | |

It is certified that error appears in the above-identified patent and that said Letters Patent is hereby corrected as shown below:

Column 3, line 5, please delete "buthanol" and insert therein --butanol--;

Column 3, line 29, please delete "buthanol" and insert therein --butanol--;

Column 4, line 6, please delete "buthanol" and insert therein --butanol--;

Column 10, line 37 (claim 3), please delete "buthanol" and insert therein --butanol--;

Column 10, line 42 (claim 5), after "non-polar solvent" insert --is--;

Column 10, line 46 (claim 6), after "polar solvent" insert --is--;

Column 10, line 48 (claim 6), please delete "buthanol" and insert therein --butanol--;

Column 11, line 6 (claim 12), please delete "buthanol" and insert therein --butanol--;

Column 12, line 33 (claim 19), please delete "buthanol" and insert therein --butanol--;

Signed and Sealed this

Seventeenth Day of April, 2007

JON W. DUDAS
*Director of the United States Patent and Trademark Office*